Patented June 15, 1937

2,083,693

UNITED STATES PATENT OFFICE 2,083,693

PRODUCTION OF ALIPHATIC ALCOHOLS AND ESTERS

Henry Dreyfus, London, England

No Drawing. Application March 18, 1933, Serial No. 661,565. In Great Britain April 21, 1932

19 Claims. (Cl. 260—108)

This invention relates to the manufacture of alcohols and/or their organic acid esters from hydrocarbons and more especially to the production of aliphatic alcohols and/or esters of low molecular weight, such for example as ethyl alcohol and ethyl acetate, propionate or formate from hydrocarbons of high molecular weight such for instance as are contained in mineral oils and the like or from lower saturated hydrocarbons.

I have shown in my U. S. Patent No. 2,020,673, that olefines, and particularly gaseous olefines, e. g. ethylene, propylene and the like can be caused to react with organic acids such as acetic acid to produce the corresponding esters, alcohols and/or ethers in accordance with the conditions and the relative proportions of acid, olefine and water.

According to the present invention I have found that alcohols and/or their organic esters can be prepared from hydrocarbons in general by subjecting them to thermal decomposition and bringing the reactants, either during or after the decomposition, to reaction with organic acids and especially with aliphatic acids in presence or absence of water.

Examples of suitable starting materials are hydrocarbons of high molecular weight, for instance such as occur in mineral oils, e. g. American, Russian or other petroleums or fractions thereof, and saturated hydrocarbons of low molecular weight such as ethane, propane and the like.

For the thermal decomposition, whether or not the acid is present at this stage, temperatures of between about 500° and 1000° C. and especially between about 600° and 800° C. are very suitable, although other temperatures may be employed if desired. Preferably, especially when esters and/or alcohols of low molecular weight are to be produced, the thermal decomposition is performed in the gaseous or vapor phase. In such cases the decomposition may advantageously be effected under pressures in the region of, or not greatly exceeding, atmospheric. To effect their decomposition, the hydrocarbons or their vapors, and the acid vapor and/or water vapor if present, may, for example, be passed through suitably heated narrow tubes or through narrow annular spaces, for instance as described in my U. S. application S. No. 629,910 filed August 22nd, 1932, or through molten metal or other baths heated to the desired temperature. The decomposition may if desired be effected in the presence of catalysts capable of promoting the thermal decomposition of hydrocarbons, especially dehydrogenation catalysts favoring the production of olefinic from saturated hydrocarbons. If desired the hydrocarbons may be employed in admixture with indifferent diluent gases such as nitrogen, or with oxides of carbon, or with steam, whether or not organic acid vapors are also present.

When the thermal decomposition is to be performed in the presence of the organic acid, or of the acid and water, the reactants, after leaving the decomposition zone, may with advantage be subjected to a moderately elevated temperature, e. g. about 200° to 600° C. and especially 350° C. to 550° C. before they are cooled to ordinary temperatures as by this means the yield of alcohols and/or esters may be favorably influenced. Such treatment, especially when the decomposition has been effected at pressures in the region of atmospheric, is preferably performed under elevated pressure, for instance under pressures up to 100 or more atmospheres, and especially pressures between 20 and 50 atmospheres. Conveniently, the reactants, after leaving the decomposition zone or vessel, may be passed through one or more vessels maintained by any convenient means at the desired temperature. When it is desired to effect this treatment under elevated pressure the reactants may be compressed during their passage from the decomposition vessel to that employed for the medium temperature treatment. If desired further quantities of the organic acid with or without water may be added to the reaction product, for instance before or during the treatment at moderate temperatures as described above.

In another method of applying the invention the thermal decomposition of the hydrocarbons may be effected in the substantial absence of organic acid and/or of steam. In such cases the product of the decomposition or any desired fraction thereof, for example a fraction containing a considerable proportion of lower olefines, may subsequently be subjected to reaction with the organic acid in the presence or absence of steam. Thus the product of the decomposition may be caused to react with the acid and, if desired, with steam, at temperatures between about 200° and 600° C. and especially at temperatures between about 350° C. and 550° C. Advantageously, high pressures, for example pressures up to 100 atmospheres and especially pressures above about 20 atmospheres, may be employed in this reaction. Conveniently, the product of the decomposition may be subjected to the treatment with the organic acid without being separated into fractions. Thus, for example, acetic acid or other organic acid with or without water may be added continuously or otherwise to the decomposition products after the latter have left the decomposition zone, either immediately on their leaving the decomposition zone or after they have been partly cooled, and the reaction mixture, at any stage between the decomposition zone and the moderate temperature zone, may be compressed to the pressure to be employed for the reaction.

The invention is especially concerned with the use of fatty acids of low molecular weight such as formic acid, acetic acid and propionic acid in the process described above. The quantity of act to be employed may vary considerably with the mode of operation and the nature of the product required. For instance, when esters rather than alcohols are to be produced the hydrocarbons, either before or after cracking, may be mixed with from 25% to 100% or more of their volume of the acid the hydrocarbons being reckoned to be in vapor form. In such cases in order to avoid substantial hydrolysis of the ester produced, water is preferably absent altogether or else present in comparatively small amount, for instance in amount below about 20% by volume relatively to the amount of acid vapor. When esters are the principal products desired, the greater the amount of acid employed the greater, in general, is the amount of water that may be present without causing an undue diminution in the yield, nevertheless it is preferable to employ restricted quantities of water such as indicated above, or even to operate in substantial absence of water. Similarly, when the main product is to be alcohol it is usually advisable not to employ very great excess of water vapor as such is liable to produce a dilute alcohol or to render the recovery of concentrated alcohol a matter of difficulty. Thus for every volume of hydrocarbon vapor to be treated less than one volume of water vapor may be employed, the amount of organic acid present being preferably comparatively small, for instance about 2% to 20% by volume relatively to the water vapor.

The reaction with the organic acid, whether performed simultaneously with or subsequently to the thermal decomposition of the hydrocarbons, may advantageously be effected in the presence of hydration or esterification catalysts, for example phosphoric acid, zinc chloride and the like. Other contact substances or inert filling materials, for example pumice or kieselguhr, may also be used. When the thermal decomposition is effected in the presence of the organic acid catalysts capable of furthering such decomposition, and especially catalysts tending to favor the production of olefines, may be used as well as, or in association with, hydration or esterification catalysts. Mixtures of ester and alcohol produced by the process of the invention may be converted to ester or to alcohol by appropriate esterification or hydrolysis or if feasible the mixtures may be separated into their constituents, e. g. by fractionation. For example the reaction product in admixture with either an organic acid vapor or with water vapor as desired may be passed over appropriate catalysts such as phosphoric acid, zinc chloride and the like at elevated temperatures. The following examples illustrate the invention which is in no way limited thereby.

*Example 1*

An American petroleum fraction of boiling point between 200° and 350° C. is vaporized and mixed with 70% of its volume of acetic acid vapor.

The mixed vapors are passed at atmospheric pressure through a series of narrow tubes heated to a temperature of 700° C. The vapors leaving the reaction zone are compressed and passed under a pressure of 40 atmospheres through a similar series of tubes containing phosphoric acid deposited on pumice and heated to a temperature of 400° C. The vapors issuing from the second set of tubes may be cooled while still under pressure in order to separate ethyl acetate and other condensable products from the gases or vapors.

*Example 2*

A petroleum fraction similar to that employed in Example 1 is vaporized and mixed with a small quantity of water vapor and is then passed rapidly at atmospheric pressure through a series of narrow tubes heated to a temperature of 800° C. After leaving the reaction zone the vapors are mixed with 60% of their volume of acetic acid vapor, compressed to a pressure of 50 atmospheres and passed at this pressure and at a temperature of 400° C. over a catalyst mass comprising phosphoric acid deposited on pumice. On leaving the reaction zone, the products are condensed as in Example 1.

What I claim and desire to secure by Letters Patent is:—

1. Process for the manufacture of alcohols and esters, which comprises thermally decomposing hydrocarbons in the presence of the vapor of a carboxylic acid containing at least two carbon atoms in the molecule.

2. Process for the manufacture of alcohols and esters, which comprises thermally decomposing hydrocarbons in the presence of the vapor of a lower fatty acid containing at least two carbon atoms in the molecule.

3. Process for the manufacture of alcohols and esters, which comprises thermally decomposing hydrocarbons in the vapor phase to a temperature between 500° and 1000° C. in the presence of the vapor of a lower fatty acid containing at least two carbon atoms in the molecule.

4. Process for the manufacture of alcohols and esters, which comprises thermally decomposing hydrocarbons in the vapor phase to a temperature between 500° and 1000° C. in the presence of the vapor of a lower fatty acid containing at least two carbon atoms in the molecule, and of steam.

5. Process for the manufacture of alcohols and esters, which comprises thermally decomposing hydrocarbons in the vapor phase in the presence of the vapor of a lower fatty acid containing at least two carbon atoms in the molecule and subjecting the products so obtained to a temperature between 200° and 600° C. under a pressure higher than atmospheric.

6. Process for the manufacture of alcohols and esters, which comprises thermally decomposing hydrocarbons in the vapor phase in the presence of the vapor of a lower fatty acid containing at least two carbon atoms in the molecule and of steam and subjecting the products so obtained to a temperature between 200° and 600° C. under a pressure higher than atmospheric.

7. Process for the manufacture of alcohols and esters, which comprises thermally decomposing hydrocarbons in the vapor phase at a temperature between 500° and 1000° C. in the presence of the vapor of a lower fatty acid containing at least two carbon atoms in the molecule and subjecting the products so obtained to a temperature between 350° and 550° C. under a pressure between 20 and 100 atmospheres.

8. Process for the manufacture of alcohols and esters, which comprises thermally decomposing hydrocarbons in the vapor phase at a temperature between 500° and 1000° C. in the presence of the vapor of a lower fatty acid containing at least two carbon atoms in the molecule and subjecting the products so obtained to a temperature between 350° and 550° C. under a pressure between 20 and 100 atmospheres and in the presence of an esterification catalyst.

9. Process for the manufacture of alcohols and esters, which comprises thermally decomposing hydrocarbons in the vapor phase at a temperature between 500° and 1000° C. in the presence of the vapor of a lower fatty acid containing at least two carbon atoms in the molecule, and of steam and subjecting the products so obtained to a temperature between 350° and 550° C. under a pressure between 20 and 100 atmospheres and in the presence of an esterification catalyst.

10. Process for the manufacture of alcohols and esters, which comprises thermally decomposing hydrocarbons in the vapor phase in contact with a dehydrogenation catalyst and in the presence of the vapor of a carboxylic acid containing at least two carbon atoms in the molecule and subjecting the products so obtained to a temperature between 200° and 600° C. under a pressure higher than atmospheric.

11. Process for the manufacture of alcohols and esters, which comprises thermally decomposing hydrocarbons in the vapor phase in contact with a dehydrogenation catalyst and with an esterification catalyst in the presence of the vapor of a carboxylic acid containing at least two carbon atoms in the molecule.

12. Process for the manufacture of alcohols and esters, which comprises thermally decomposing hydrocarbons in the vapor phase in contact with a dehydrogenation catalyst in the presence of the vapor of a carboxylic acid containing at least two carbon atoms in the molecule, and of steam and subjecting the products so obtained to a temperature between 200° and 600° C. under a pressure higher than atmospheric.

13. Process for the manufacture of alcohols and esters, which comprises thermally decomposing hydrocarbons in the vapor phase in contact with a dehydrogenation catalyst and with an esterification catalyst in the presence of the vapor of a carboxylic acid containing at least two carbon atoms in the molecule and of steam.

14. Process for the manufacture of alcohols and esters, which comprises thermally decomposing hydrocarbons and subjecting the products in admixture with the vapor of a carboxylic acid containing at least two carbon atoms in the molecule to reaction at a temperature between 200° and 600° C. under a pressure higher than atmospheric.

15. Process for the manufacture of alcohols and esters, which comprises thermally decomposing hydrocarbons and subjecting the products in admixture with the vapor of a carboxylic acid containing at least two carbon atoms in the molecule, and with steam to reaction at a temperature between 200° and 600° C. under a pressure higher than atmospheric.

16. Process for the manufacture of alcohols and esters, which comprises thermally decomposing hydrocarbons and subjecting the products in admixture with the vapor of a carboxylic acid containing at least two carbon atoms in the molecule to reaction at a temperature between 200° and 600° C. under a pressure higher than atmospheric and in the presence of an esterification catalyst.

17. Process for the manufacture of alcohols and esters, which comprises thermally decomposing hydrocarbons and subjecting the products in admixture with the vapor of a carboxylic acid containing at least two carbon atoms in the molecule, and with steam to reaction at a temperature between 200° and 600° C. under a pressure higher than atmospheric and in the presence of an esterification catalyst.

18. Process for the manufacture of alcohols and esters, which comprises thermally decomposing hydrocarbons and subjecting the products in admixture with the vapor of a carboxylic acid containing at least two carbon atoms in the molecule to reaction at a temperature between 350° and 550° C. under a pressure between 20 and 100 atmospheres.

19. Process for the manufacture of alcohols and esters, which comprises thermally decomposing hydrocarbons and subjecting the products in admixture with the vapor of a carboxylic acid containing at least two carbon atoms in the molecule, and with steam to reaction at a temperature between 350° and 550° C. under a pressure between 20 and 100 atmospheres.

HENRY DREYFUS.